Patented Aug. 22, 1933

1,923,608

UNITED STATES PATENT OFFICE 1,923,608

PROCESS FOR THE PREPARATION OF ALIPHATIC SULPHOACIDS

Heinrich Bertsch, Chemnitz, Germany, assignor to H. Th. Böhme Aktiengesellschaft, Chemnitz, Germany, a Corporation of Germany No Drawing. Application October 10, 1928, Serial 311,713, and in Germany October 11, 1927

3 Claims. (Cl. 87—12)

This invention relates to the preparation of aliphatic sulpho-acids suitable for textile purposes, particularly as wetting, cleaning and emulsifying agents.

It is known that higher fatty acids of the oleic or ricinoleic acid type partly enter into addition compounds with sulphuric acid and partly form sulphuric acid esters when treated with sulphuric acid. These addition compounds or esters have long been known and used under the name of Turkey red oils in the form of their sodium salts. As may be explained from their chemical constitution, they are substances of comparatively little stability and consequently decompose, on boiling with water or dilute acids, back into water-insoluble cleavage products, the sulphuric acid radicle splitting off.

Success has already attended efforts to improve these products materially and to enhance to a very substantial extent the formation of the sulphuric acid esters, which certainly leads to a condition of equilibrium by the addition in the sulphuric acid treatment of organic acid anhydrides or acid chlorides.

It has now been found that aliphatic carboxylic acid with a higher molecular weight, or their esters, of an unsaturated character behave quite differently, under certain conditions, in the treatment with sulphuric acid in the presence of organic acid anhydrides or acid chlorides and that the resultant reaction products differ in a fundamental fashion from the highterto known, so-called sulphonated oils. The action of the sulphuric acid, is clearly no longer upon the double linkage or on the hydroxyl group with the effect that an addition or esterification takes place, but it is to be assumed that a hydrogen atom in the methylene group adjacent the double linkage is replaced by the sulpho-acid radicle and that a genuine aliphatic sulpho-acid is thus produced which can no longer be claimed to be or regarded as a Turkey red oil. This assumption is based upon the fact that such an aliphatic sulpho-acid does not split off a sulphuric acid radicle either on boiling with water or on boiling with acids or even on treatment with alkalies and that consequently it exhibits complete resistance to all saponifying agencies. Thus, it behaves absolutely analogously to an aromatic sulpho-acid so that there can no longer be any question of an addition compound or a sulphuric acid ester. This class of substances so produced, and not hitherto used in the textile industry has extremely valuable properties which make it particularly suitable for use in the entire textile and leather industries. It forms, for example, readily soluble alkali, or alkaline earth and magnesium salts and is thus thoroughly resistant to the action of hard water. For wetting, cleaning, emulsifying or like purposes it may be used mixed with hydrocarbons or halo-hydrocarbons.

Example I 300 kgs. of oleic acid are mixed with 100 kgs. of acetic anhydride and brought into reaction with 300 kgs. of sulphuric acid at temperatures below 10°. After the mixture has become clearly soluble in water, the excess presence of sulphuric acid is washed out with Glauber salt solution. The resultant sulpho-acid is clearly soluble in water. The sulpho-acid may be used as such or in the form of the sodium saft obtained by neutralization. The alkali salts may also be prepared in a dry form and even in this condition retain their valuable characteristics.

Example II 100 kgs. of linoleic acid methyl ester are treated with 30 kgs. of acetyl chloride and sulphonated at 0° with 100 kgs. of sulphuric acid. After washing, a sulpho-acid of properties equally valuable with those in Example I is obtained.

The following Formulæ I and II indicate the reactions which in all probability take place concurrently and Formula III indicates the reactions in which the sulfurizing is effected without the addition of organic acid derivatives.

I.

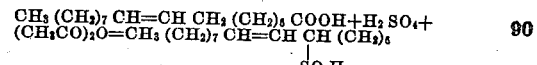

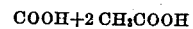

II.

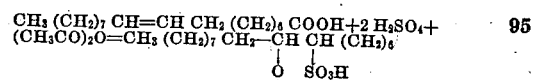

III.

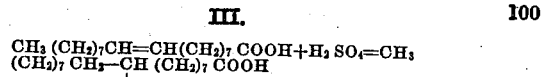

I claim:

1. Process for the preparation of aliphatic sulpho-acids distinguished by the treatment of an unsaturated aliphatic acid substance of higher molecular weight with the exception of unsaturated aliphatic oxy-compounds with sulphuric acid in the presence of not considerably more than one molecular weight of an anhydrous organic acid radical compound per one double linkage of fatty acid molecule.

2. Process for the preparation of an aliphatic sulpho-acid distinguished by the treatment of an unsaturated aliphatic acid of higher molecular weight with the exception of oxy-fatty acids with sulphuric acid in the presence of not considerably more than one molecular weight of an anhydrous organic acid radical compound per one double linkage of fatty acid molecule.

3. Process for the preparation of an aliphatic sulpho-acid for use in liquid treatment of fibrous materials, distinguished by the sulphonation of oleic acid in the presence of not considerably more than 102 parts of acetic acid anhydride per 282 parts of oleic acid.

HEINRICH BERTSCH.